(12) United States Patent
Masuda et al.

(10) Patent No.: US 12,428,820 B2
(45) Date of Patent: Sep. 30, 2025

(54) CONSTRUCTION MACHINE

(71) Applicant: HITACHI CONSTRUCTION MACHINERY CO., LTD., Tokyo (JP)

(72) Inventors: Shinsuke Masuda, Tsuchiura (JP); Yuuta Tamura, Tsuchiura (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 0 days.

(21) Appl. No.: 18/691,234

(22) PCT Filed: Feb. 6, 2023

(86) PCT No.: PCT/JP2023/003721
§ 371 (c)(1),
(2) Date: Mar. 12, 2024

(87) PCT Pub. No.: WO2023/153348
PCT Pub. Date: Aug. 17, 2023

(65) Prior Publication Data
US 2024/0376692 A1  Nov. 14, 2024

(30) Foreign Application Priority Data
Feb. 10, 2022  (JP) .................................. 2022-019405

(51) Int. Cl.
*E02F 9/24* (2006.01)
*B60N 2/75* (2018.01)
(Continued)

(52) U.S. Cl.
CPC ................ *E02F 9/24* (2013.01); *B60N 2/797* (2018.02); *E02F 9/16* (2013.01); *E02F 9/2004* (2013.01)

(58) Field of Classification Search
CPC ... E02F 9/24; E02F 9/16; E02F 9/2004; E02F 3/32; E02F 9/166; B60N 2/797; G05G 5/005; B60Y 2200/412
See application file for complete search history.

(56) References Cited

U.S. PATENT DOCUMENTS 9,481,979 B2 * 11/2016 Hiraoka ................... E02F 3/325
10,407,871 B2 * 9/2019 Nishigori ............... B60N 2/646
(Continued)

FOREIGN PATENT DOCUMENTS

JP  09-209405 A  8/1997
JP  2002-070079 A  3/2002
(Continued)

OTHER PUBLICATIONS

International Search Report of PCT/JP2023/003721 dated Mar. 20, 2023.

*Primary Examiner* — Jason D Shanske
*Assistant Examiner* — Joselynn Y Sliteris
(74) *Attorney, Agent, or Firm* — Mattingly & Malur, PC (57) ABSTRACT

A left console device (13) positioned on an entrance passage (9A)-side is provided with a support shaft (15) disposed on a seat base (11), and a rotational frame (17) rotatably supported by the support shaft (15). A gate lock lever (25) is provided with a base plate (25A) that is rotatably supported via a first shaft body (17D) on the rotational frame (17) and in which a second shaft body (25D) is disposed, and a lever member (25B) that is provided with a gripping part (25E) and is disposed to be integral with the base plate (25A). A guide plate (26) is rotatably attached to a seat base (11). A guide groove (27) disposed on the guide plate (26) restricts a movement of the second shaft body (25D) to suppress a change in a height position of the gripping pin (25E) of the lever member (25B) when the rotational frame (Continued)

(17) rotates centering on the support shaft (15) together with the gate lock lever (25).

3 Claims, 10 Drawing Sheets

(51) Int. Cl.
*E02F 9/16* (2006.01)
*E02F 9/20* (2006.01)

(56) References Cited

U.S. PATENT DOCUMENTS

| | | | |
|---|---|---|---|
| 10,612,211 B2* | 4/2020 | Yuan | E02F 9/24 |
| 11,473,268 B2* | 10/2022 | Nishigori | E02F 9/16 |
| 12,054,912 B2* | 8/2024 | Arnal | E02F 9/2004 |
| 12,091,836 B2* | 9/2024 | Shiiguchi | E02F 9/0875 |
| 12,222,743 B2* | 2/2025 | Hatta | E02F 9/16 |
| 12,312,001 B2* | 5/2025 | Kato | E02F 9/166 |
| 2018/0282971 A1 | 10/2018 | Yuan et al. | |
| 2025/0101713 A1* | 3/2025 | Hatta | E02F 9/20 |

FOREIGN PATENT DOCUMENTS

| | | | |
|---|---|---|---|
| JP | 2005-105591 A | 4/2005 | |
| JP | 2012-127137 A | 7/2012 | |
| JP | 2016-188553 A | 11/2016 | |
| JP | 2018-168566 A | 11/2018 | |

* cited by examiner

CONSTRUCTION MACHINE

TECHNICAL FIELD

The present invention relates to construction machines such as a hydraulic excavator provided with console devices on both left and right sides of an operator's seat.

BACKGROUND ART

A hydraulic excavator representative of a construction machine is provided with an automotive vehicle body composed of a lower traveling structure and an upper revolving structure, and a working mechanism disposed on the front side of the upper revolving structure. A cab for defining an operator's room therein is disposed on the front left side of the upper revolving structure. An operator's seat is disposed within the cab, and console devices each provided with a control lever are arranged on both sides of the operator's seat in the left-right direction. An operator sits on the operator's seat from an entrance formed on a left side surface of the cab through an entrance passage on a floor plate and operates the left and right control levers. Actuators for a revolving operation of the upper revolving structure and an operation of the working mechanism are controlled in response to operations to the control levers.

A gate lock lever is disposed in the left console device on the entrance passage side out of the left and right console devices. This gate lock lever is operable to control supply of a pilot pressure to the control lever and is displaced to a locking position for prohibiting the operation of the actuator regardless of the operation of the control lever and a lock releasing position for allowing the operation of the actuator in response to the operation of the control lever. When the gate lock lever is displaced to the locking position, the entrance passage is released, and when the gate lock lever is displaced to the lock releasing position, the entrance passage is blocked out. Because of this configuration, when an operator or the like goes through the released entrance, even if he or she comes in contact with the control lever in error, the actuator can be prevented from inadvertently being operated.

Incidentally, operators of various physiques are seated on the operator's seat. Therefore, there is known a hydraulic excavator in which a height of the console device provided with the control lever is changed, thereby enabling each height position of the left and right control levers to be adjusted relative to the operator's seat, for enabling the operator to operate the control lever in a comfortable posture (Patent Document 1). Further, there is known a hydraulic excavator in which in order that an operator of a large physique can smoothly go through the entrance passage from the entrance of the cab to the operator's seat, one of the console devices positioned on the entrance passage side is made movable in a direction of widening the entrance passage (backward) (Patent Document 2).

PRIOR ART DOCUMENT

Patent Document

Patent Document 1: Japanese Patent Laid-Open No. 2018-168566 A

Patent Document 2: Japanese Patent Laid-Open No. 2012-127137 A

SUMMARY OF THE INVENTION

According to Patent Document 1, however, the mechanism for moving the console device is not disposed and the entrance passage is narrowed by the console device. Therefore, it is difficult for an operator to go through the entrance passage smoothly. On the other hand, according to Patent Document 2, since the mechanism for adjusting the height position of the control lever relative to the operator's seat is not disposed, it becomes difficult for the operators of various physiques to operate the control lever in a comfortable posture.

Therefore, it is considered to incorporate a mechanism that can move in a direction of widening the entrance and a mechanism (height adjusting mechanism) that adjusts the height position of the control lever relative to the operator's seat into the console device on the entrance passage side. In this case, since the gate lock lever is disposed in the console device on the entrance passage side, the gate lock lever is changed in a position in association with the movement of the console device of which a position is changed by the height adjusting mechanism. When the height position of the control lever is adjusted by the height adjusting mechanism, in a case where the height position of the gate lock lever is changed, there is a problem that an operator feels uncomfortable when the operator grips a gripping part of the gate lock lever. Further, since the gate lock lever is designed to prohibit the operation of the actuator, it is preferable that the gate lock lever is always in the same position, but when the position is changed by the height adjusting mechanism, there occurs a problem that operability to the gate lock lever deteriorates.

An object of the present invention is to provide a construction machine that can maintain the operability to a gate lock lever to be good even in a case where a height position of a control lever is adjusted relative to an operator's seat.

A construction machine according to the present invention comprises: an operator's seat; a console device provided with an control lever for operating an actuator; and a gate lock lever that is disposed in the console device and is displaced to a locking position for prohibiting an operation of the actuator in response to an operation of the control lever and a lock releasing position for allowing the operation of the actuator in response to the operation of the control lever, characterized in that the console device includes: a support shaft disposed in a seat base to which the operator's seat is attached; a rotational frame that is supported to be rotatable in an upper-lower direction on the support shaft and to which the control lever is attached; and a height adjusting mechanism for adjusting a position of the rotational frame in a rotating direction centering on the support shaft, and the gate lock lever includes: a base plate that is supported to be rotatable on a first shaft body disposed in the rotational frame and in which a second shaft body is disposed in a position different from that of the first shaft body, and a lever member that is disposed to be integral with the base plate and is provided with a gripping part for the gripping of an operator, wherein the seat base is provided with a guide member rotatable in a front-back direction of the operator's seat, the guide member being provided with a guide groove formed for engagement of the second shaft body of the gate lock lever, and the guide groove restricting a movement of the second shaft body following a change in a position of the rotational frame by the height adjusting mechanism in the rotating direction centering on the support shaft to suppress a change in a height position of the gripping part of the lever member.

According to the present invention, when the height adjustment of the control lever is performed and the rotational frame rotates in the upper-lower direction centering on the support shaft, the movement of the second shaft body disposed on the base plate of the gate lock lever is restricted by the guide groove of the guide member. With this configuration, a change in the height position of the gripping part of the gate lock lever can be suppressed.

BRIEF DESCRIPTION OF THE DRAWINGS

FIG. 2 is a perspective view showing an operator's seat, console devices, a gate lock lever and the like.

FIG. 4 is an exploded perspective view showing a support shaft, a rotational frame, the gate lock lever, the control lever, a guide plate and the like.

MODE FOR CARRYING OUT THE INVENTION

Hereinafter, an explanation will be in detail made of a construction machine according to an embodiment in the present invention with reference to the accompanying drawings by taking a case of being applied to a hydraulic excavator as an example. It should be noted that an explanation will be made of the present embodiment in such a manner that a traveling direction of the hydraulic excavator is defined as a front-back direction, and a direction perpendicular to the traveling direction of the hydraulic excavator is defined as a left-right direction.

Figure 1:
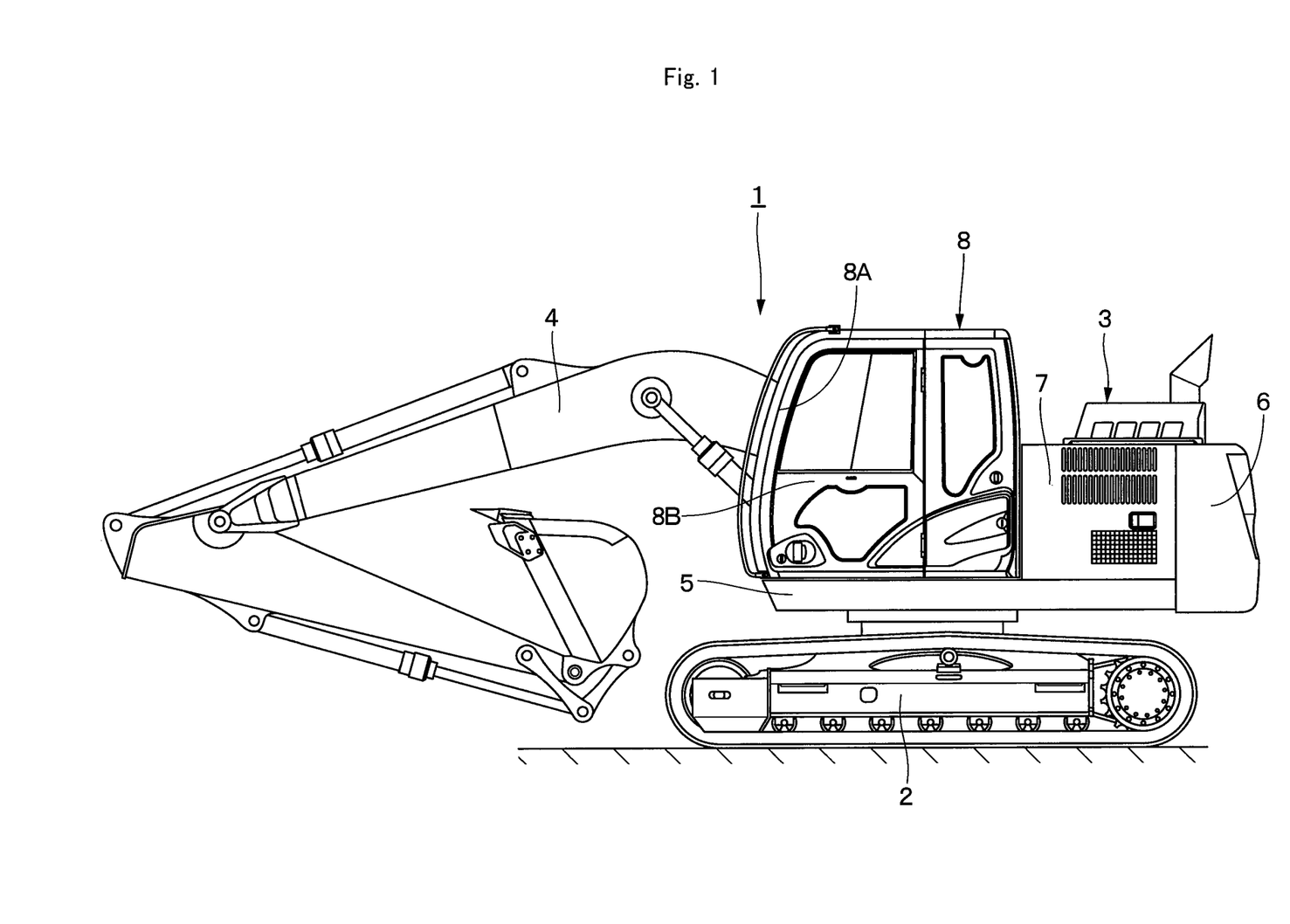
FIG. 1 is a left side view showing a hydraulic excavator according to an embodiment in the present invention.

In the figure, a hydraulic excavator 1 representative of a construction machine is provided with an automotive lower traveling structure 2 of a crawl type in the front-back direction and an upper revolving structure 3 that is mounted on the lower traveling structure 2 to be capable of revolving thereon. The lower traveling structure 2 and the upper revolving structure 3 configure a vehicle body in the hydraulic excavator 1. A working mechanism 4 is disposed on the front side of the upper revolving structure 3 to be capable of tilting and lifting thereto. The hydraulic excavator 1 travels in the working site by the lower traveling structure 2, and tilts and lifts the working mechanism 4 while revolving the upper revolving structure 3, thus performing an excavating work of earth and sand, or the like.

The upper revolving structure 3 is provided with a revolving frame 5 as a base. A counterweight 6 is disposed on the rear side of the revolving frame 5 to act as a weight balance to the working mechanism 4. Mounted equipment devices (none of them are shown) of an engine, a hydraulic pump, a heat exchanger and the like are mounted on the revolving frame 5 to be positioned in the front side to the counterweight 6. The mounted equipment devices are covered with an exterior cover 7 disposed on the revolving frame 5. A cab 8 is disposed on the front left side of the upper revolving structure 3 to define an operator's room therein.

Figure 2:
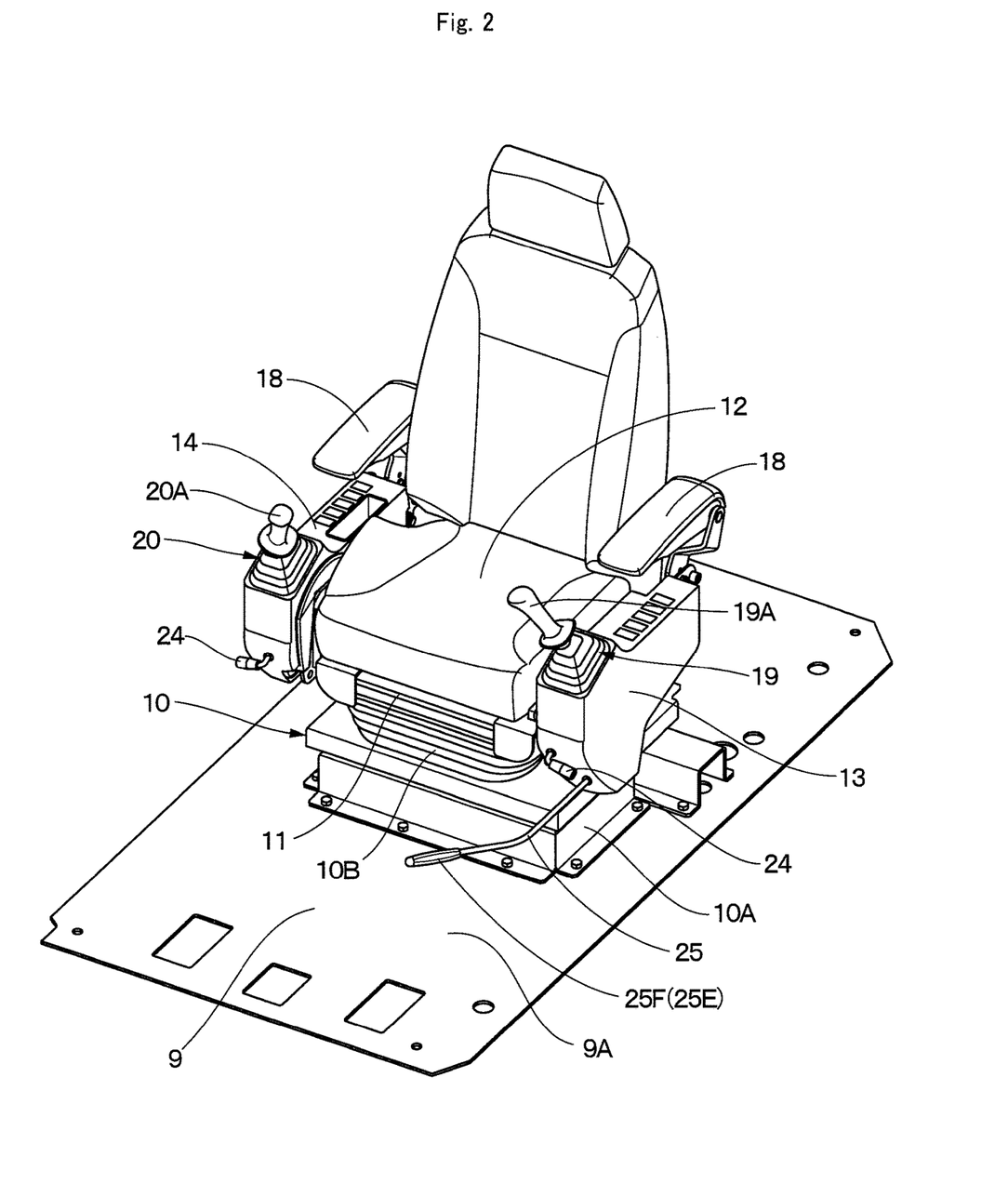

The cab 8 rises upward from the revolving frame 5 to be formed in a boxy shape and the operator's room is defined in the inside of the cab 8. An entrance 8A for an operator to get in/off the cab 8 and a door 8B for opening/closing the entrance 8A are arranged on the left side surface of the cab 8. A lower side of the cab 8 is covered with a floor member 9. The floor member 9 configures a floor plate of the cab 8 and as shown in FIG. 2, is formed as a rectangular plate body elongated in the front-back direction. An operator's seat 12, a left console device 13, a right console device 14 and a gate lock lever 25, which will be described later, and the like are arranged in the operator's room in the cab 8, and a left front part of the floor member 9 serves as an entrance passage 9A for the operator to move (getting in/off) between the entrance 8A of the cab 8 and the operator's seat 12.

An operator's seat support platform 10 is disposed in an intermediate position of the floor member 9 in the front-back direction. The operator's seat support platform 10 includes a seating 10A fixed on the floor member 9, a position adjusting mechanism 10B disposed on the seating 10A and a seat base 11 disposed on the position adjusting mechanism 10B. Since operators of various physiques sit on the operator's seat 12, an optimal position of the control lever differs depending on the operator. Therefore, disposing the position adjusting mechanism 10B on the operator's seat support platform 10 enables the operator's seat 12, the left console device 13 and the right console device 14 to be adjusted in a position in the front-back direction and in the upper-lower direction.

Figure 4:
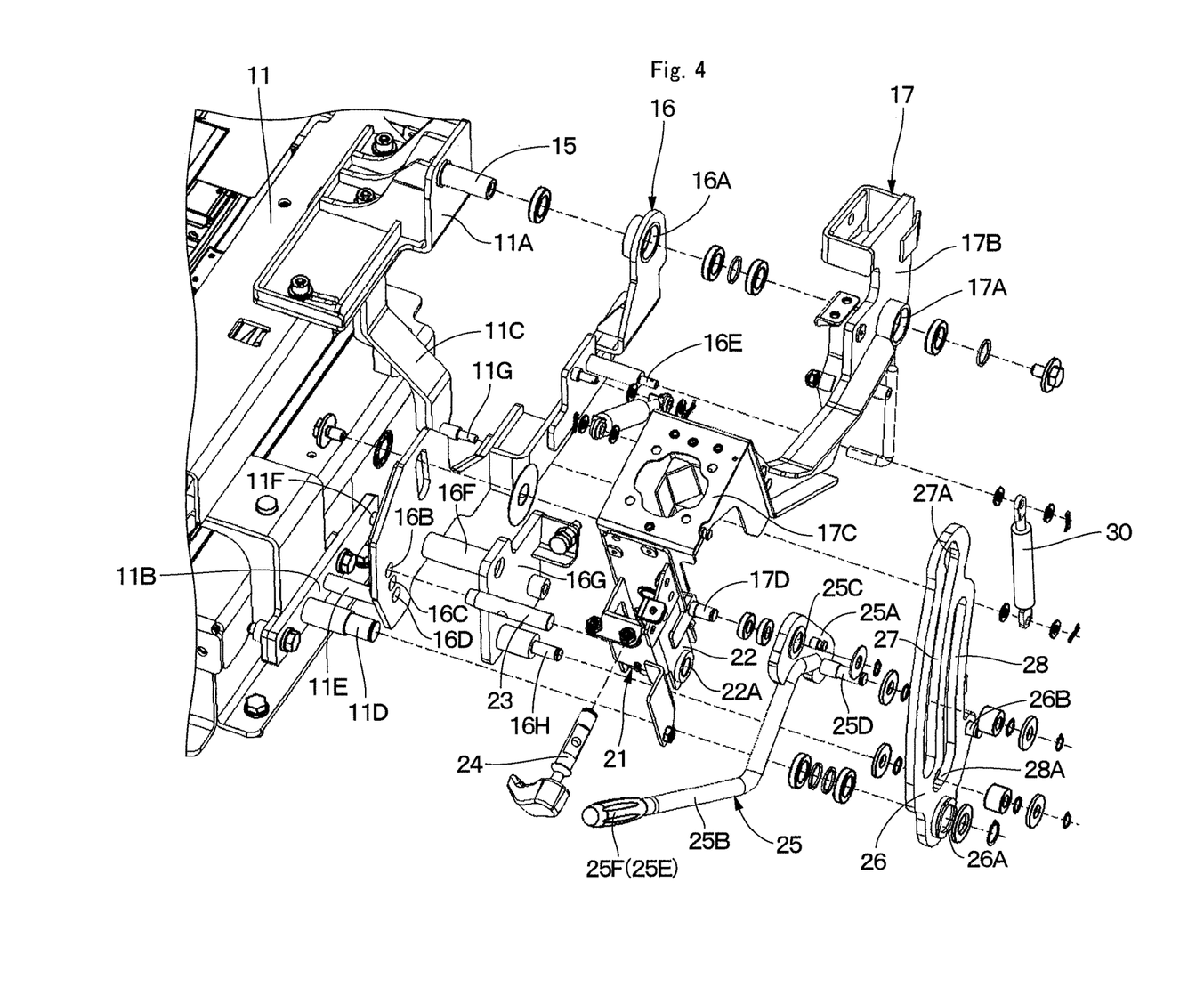

The seat base 11 is located above the position adjusting mechanism 10B and configures a base for attaching the operator's seat 12, the left console device 13, the right console device 14 and the like. The seat base 11 is formed in a flat boxy shape as a whole and as shown in FIG. 4, a left rear projection plate 11A that projects upward is disposed on a left rear part of the seat base 11 and a support shaft 15 to be described later is disposed on the left rear projection plate 11A. On the other hand, a right rear projection plate (not shown) is disposed on a right rear part of the seat base 11 in a position symmetrical to the left rear projection plate 11A in the left-right direction and a support shaft (not shown) is disposed on the right rear projection plate.

A left front projection plate 11B that projects downward is disposed on a left front part of the seat base 11. Further, a left intermediate projection plate 11C that projects downward is disposed, which is in a portion closer to the left rear projection plate 11A, in an intermediate part of the seat base 11 in the front-back direction. A guide plate shaft 11D, a stopper shaft 11E and a lower engagement pin 11F are arranged on a lower end side of the left front projection plate 11B at intervals in the front-back direction and respectively project to the left side from the left front projection plate 11B.

Figure 3:
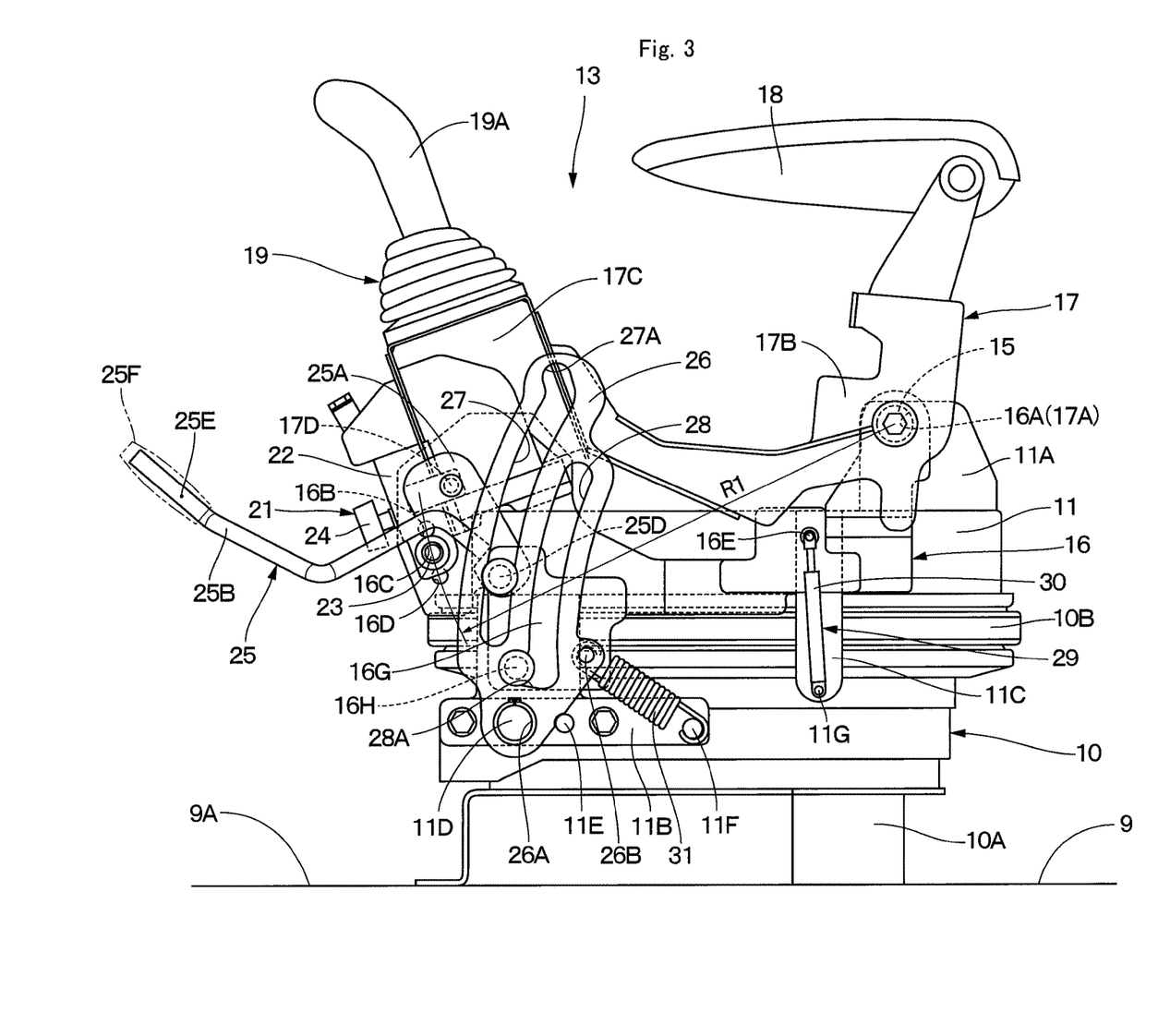
FIG. 3 is a left side view showing a state where a control lever is displaced to an intermediate height by a height adjusting mechanism.

A guide plate 26 to be described later is attached to a projection end side of the guide plate shaft 11D to be rotatable in the front-back direction. The stopper shaft 11E holds the guide plate 26 to a lever height adjusting posture as shown in FIG. 3 due to the guide plate 26 abutting on the stopper shaft 11E. One end of a coil spring 31 to be described later is engaged to the lower engagement pin 11F. On the other hand, a lower gas spring pin 11G is fixed on a lower end side of the left intermediate projection plate 11C and projects to the left side from the left intermediate projection plate 11C. A bottom side of a gas spring 30 to be described later is attached to the lower gas spring pin 11G.

The operator's seat 12 is disposed on the seat base 11 of the operator's seat support platform 10. The left console device 13 provided with the control lever 19 is located on the left side of the operator's seat 12 and the right console device 14 provided with the control lever 20 is located on the right side of the operator's seat 12. An operator sitting on the operator's seat 12 operates the left and right control levers 19, 20, thereby controlling the operations of actuators of the revolving motor for driving the upper revolving structure 3, the hydraulic cylinder for driving the working mechanism 4, and the like.

Next, an explanation will be made of the left console device 13 and the right console device 14 according to the present embodiment. The left console device 13 and the right console device 14 are formed to be substantially symmetrical to each other in the left-right direction. Therefore, hereinafter an explanation will be made of the details of the configuration of the left console device 13 as one of the console devices positioned on the entrance passage 9A-side, and in the right console device 14, components corresponding to those in the left console device 13 are referred to as the identical numerals and an explanation thereof is omitted.

The left console device 13 is located on the left side of the operator's seat 12 and is provided with the control lever 19 for operating the actuator. The left console device 13 configures one of the console devices positioned on the entrance passage 9A-side of the floor member 9. The left console device 13 includes the support shaft 15, a rotational bracket 16, a rotational frame 17, the gate lock lever 25, the guide plate 26 and the like.

The support shaft 15 is disposed on a left rear part of the seat base 11 and projects to the left side. The support shaft 15 is formed in a columnar shape and supports the rotational bracket 16 and the rotational frame 17 to be rotatable relative to the seat base 11.

The rotational bracket 16 is disposed adjacent to the left side of the seat base 11. As shown in FIG. 4, the rotational bracket 16 is formed in a plate shape extending in the front-back direction as a whole. A shaft through hole 16A is formed in a rear upper side of the rotational bracket 16 and the support shaft 15 is inserted via a bearing in the shaft through hole 16A. With this configuration, the rotational bracket 16 is designed to be rotatable in the upper-lower direction centering on the support shaft 15. A plurality (for example, three holes) of height adjusting holes 16B, 16C, 16D are arranged on the front end side of the rotational bracket 16. The height adjusting holes 16B, 16C, 16D are arranged at a constant interval on a circular arc of a radius R1 centering on a center (shaft center of the support shaft 15) of the shaft through hole 16A, and a positioning pin 23 to be described later is fitted selectively into any one of the height adjusting holes 16B, 16C, 16D.

An upper gas spring pin 16E is disposed in an intermediate part of the rotational bracket 16 in the longitudinal direction (front-back direction). The upper gas spring pin 16E is formed in a stepped columnar shape and projects to the left side from the rotational bracket 16. A rod side of the gas spring 30 is attached to be rotatable on a projection end of the upper gas spring pin 16E. In addition, A shaft attachment plate 16G is attached via a spacer 16F on the front side of the rotational bracket 16. A third shaft body 16H in a stepped columnar shape is disposed on the shaft attachment plate 16G to project to the left side and a projection end of the third shaft body 16H is engaged to a second guide groove 28 of the guide plate 26.

The rotational frame 17 is disposed adjacent to the left side of the rotational bracket 16. The rotational frame 17 is formed in a frame shape extending in the front-back direction as a whole. A shaft through hole 17A is formed in a rear side of the rotational frame 17 and the support shaft 15 is inserted via a bearing in the shaft through hole 17A. With this configuration, the rotational frame 17 is designed to be rotatable in the upper-lower direction centering on the support shaft 15. A rear-side attachment part 17B in a square cylinder shape is disposed on the upper side of the shaft through hole 17A in the rotational frame 17. An armrest 18 on which an operator sitting on the operator's seat 12 places an operator's arm is attached to the rear-side attachment part 17B.

A boxy front-side attachment part 17C is disposed on the front side of the rotational frame 17. The control lever 19 is attached to the front-side attachment part 17C and a pin support case 22 configuring part of a height adjusting mechanism 21 is disposed on the front end of the front-side attachment part 17C. In addition, a first shaft body 17D in a columnar shape is disposed to project to the left side on the front-side attachment part 17C and a base plate 25A of the gate lock lever 25 is rotatably supported on the first shaft body 17D.

The control lever 19 is disposed in the left console device 13 and the control lever 20 is disposed in the right console device 14. The left and right control levers 19, 20 are operated by an operator to control the operations of actuators such as the revolving motor for performing a revolving operation of the upper revolving structure 3, the hydraulic cylinder configuring part of the working mechanism 4 and the like. The control lever 19 includes a pilot valve of a pressure reducing valve type (not shown) attached to the front-side attachment part 17C of the rotational frame 17, and a lever part 19A that extends upward from the pilot valve and is gripped by an operator. The control lever 20 on the right side also includes a pilot valve of a pressure reducing valve type (not shown), and a lever part 20A that is gripped by an operator.

The height adjusting mechanism 21 is disposed on the front side of the left console device 13 to adjust a height position of the control lever 19 relative to the operator's seat 12 in a stepwise fashion (for example, in three stages). It should be noted that a height adjusting mechanism is disposed also on the front side of the right console device 14 to adjust a height position of the control lever 20 and the height adjusting mechanism on the right side is configured to be similar to the height adjusting mechanism 21 on the left side. Therefore, hereinafter, an explanation will be made of the height adjusting mechanism 21 on the left side and an explanation of the height adjusting mechanism on the right side is omitted. As shown in FIG. 4, the height adjusting mechanism 21 includes the three height adjusting holes 16B, 16C, 16D, the pin support case 22, the positioning pin 23 and a release lever 24.

The pin support case 22 is disposed on the front end of the front-side attachment part 17C configuring part of the rotational frame 17. The pin support case 22 is formed in a square cylinder shape extending in the upper-lower direction and a pin through hole 22A is disposed on the lower end side of the pin support case 22 to penetrate therethrough in the left-right direction. In addition, a lever through hole (not shown) is disposed on the front surface of the pin support case 22 to be positioned closer to the upper side than the pin through hole 22A and penetrate therethrough in the front-back direction.

The positioning pin 23 is supported to be movable on the pin support case 22. The positioning pin 23 is formed in a columnar shape extending in the left-right direction and is inserted in the pin through hole 22A disposed in the pin support case 22 to be movable axially (in the left-right direction). The positioning pin 23 is urged in a projecting direction toward the rotational bracket 16 by an urgent member (not shown) of a spring or the like. In addition, when the rotational frame 17 is rotated centering on the support shaft 15, the positioning pin 23 is selectively inserted in any one of the three height adjusting holes 16B, 16C, 16D arranged in the rotational bracket 16.

Figure 5:
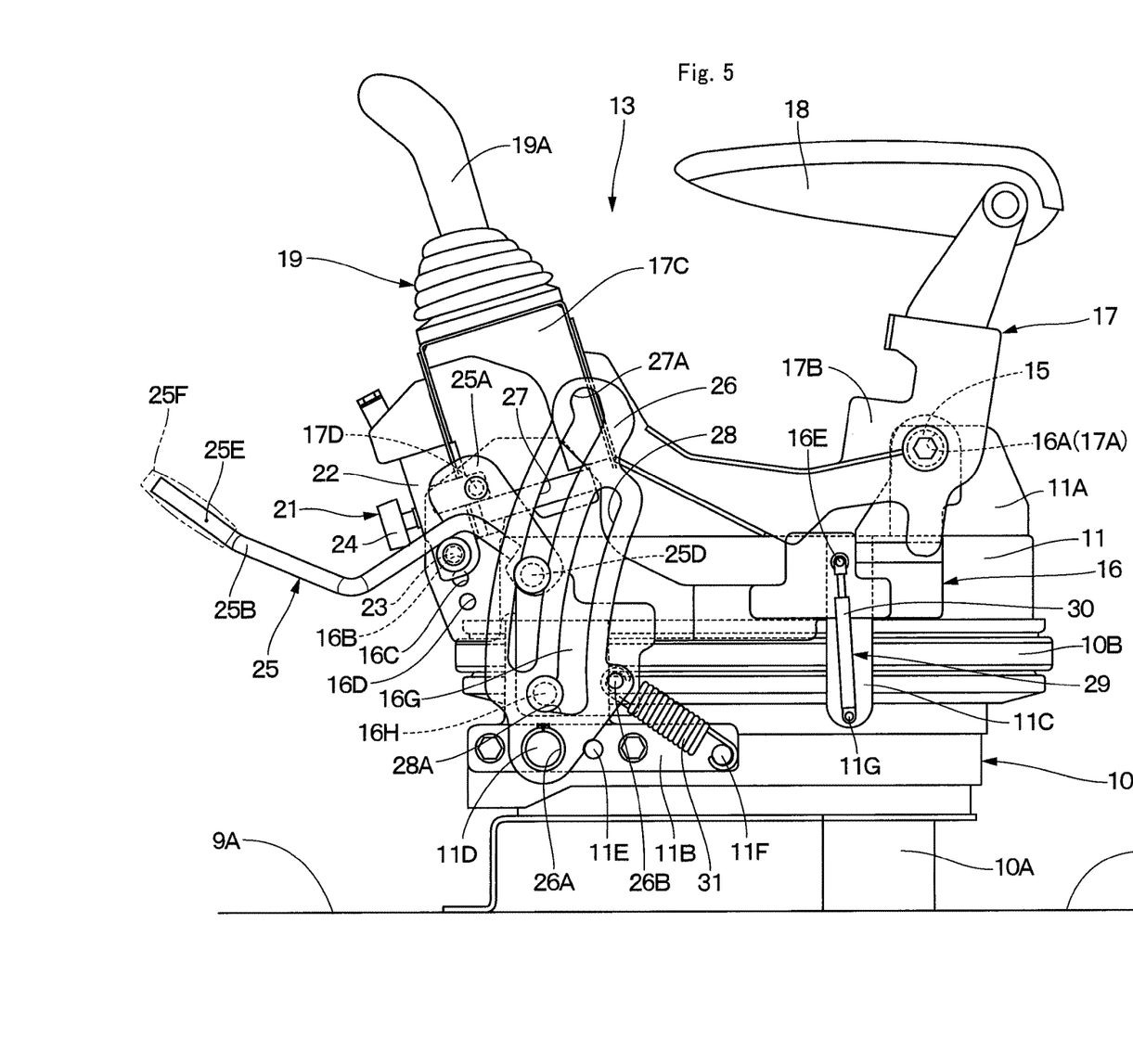
FIG. 5 is a left side view showing a state where the control lever is displaced to a maximum height by the height adjusting mechanism.

For example, as shown in FIG. 5, when the positioning pin 23 is inserted in the height adjusting hole 16B, the height position of the control lever 19 is set to a maximum height. In addition, as shown FIG. 6, when the positioning pin 23 is inserted in the height adjusting hole 16D, the height position of the control lever 19 is set to a minimum height. Further, as shown FIG. 3, when the positioning pin 23 is inserted in the height adjusting hole 16C, the height position of the control lever 19 is set to an intermediate height as intermediate between the maximum height and the minimum height. In this way, when the rotational frame 17 to which the control lever 19 is attached is locked to any height position of the height adjusting holes 16B, 16C, 16D, the height position of the control lever 19 relative to the operator's seat 12 is adjusted in three stages. In this state, the rotational bracket 16 and the rotational frame 17 are connected, and a connecting part for connecting the rotational bracket 16 and the rotational frame 17 is configured of the positioning pin 23 and the height adjusting holes 16B, 16C, 16D.

The release lever 24 is positioned closer to the upper side than the positioning pin 23 to be rotatably disposed in the pin support case 22. The release lever 24 is configured of a bar-shaped body extending in the front-back direction and is supported to be rotatable in a lever through hole (not shown) of the pin support case 22. The release lever 24 projects forward from the pin support case 22, and a projection end of the release lever 24 serves as a control part extending in the left-right direction from the front end of the left console device 13 (refer to FIG. 2). An operator sitting on the operator's seat 12 operates the control part of the release lever 24 to rotate the release lever 24.

A conversion member (not shown) that converts a rotational motion of the release lever 24 to a linear motion in an axial direction of the positioning pin 23 is disposed in the inside of the pin support case 22. Accordingly, when an operator operates the release lever 24 for rotation, the rotational motion of the release lever 24 is converted into the linear motion in the axial direction of the positioning pin 23 by the conversion member. As a result, the positioning pin 23 inserted in any one of the height adjusting holes 16B, 16C, 16D in the rotational bracket 16 leaves the height adjusting hole 16B, 16C or 16D against the urging member. Therefore, a locking state of the rotational frame 17 is released and the rotational frame 17 can rotate in the upper-lower direction centering on the support shaft 15 together with the control lever 19.

Next, an explanation will be made of the gate lock lever 25 disposed in the left console device 13.

The gate lock lever 25 is disposed in the left console device 13, which is positioned on the entrance passage 9A-side for getting in/off the operator's seat 12, out of the left console device 13 and the right console device 14. The gate lock lever 25 is operated by an operator or the like to be displaced to a locking position as shown in FIG. 7 and a lock releasing position as shown in FIG. 3.

Figure 7:
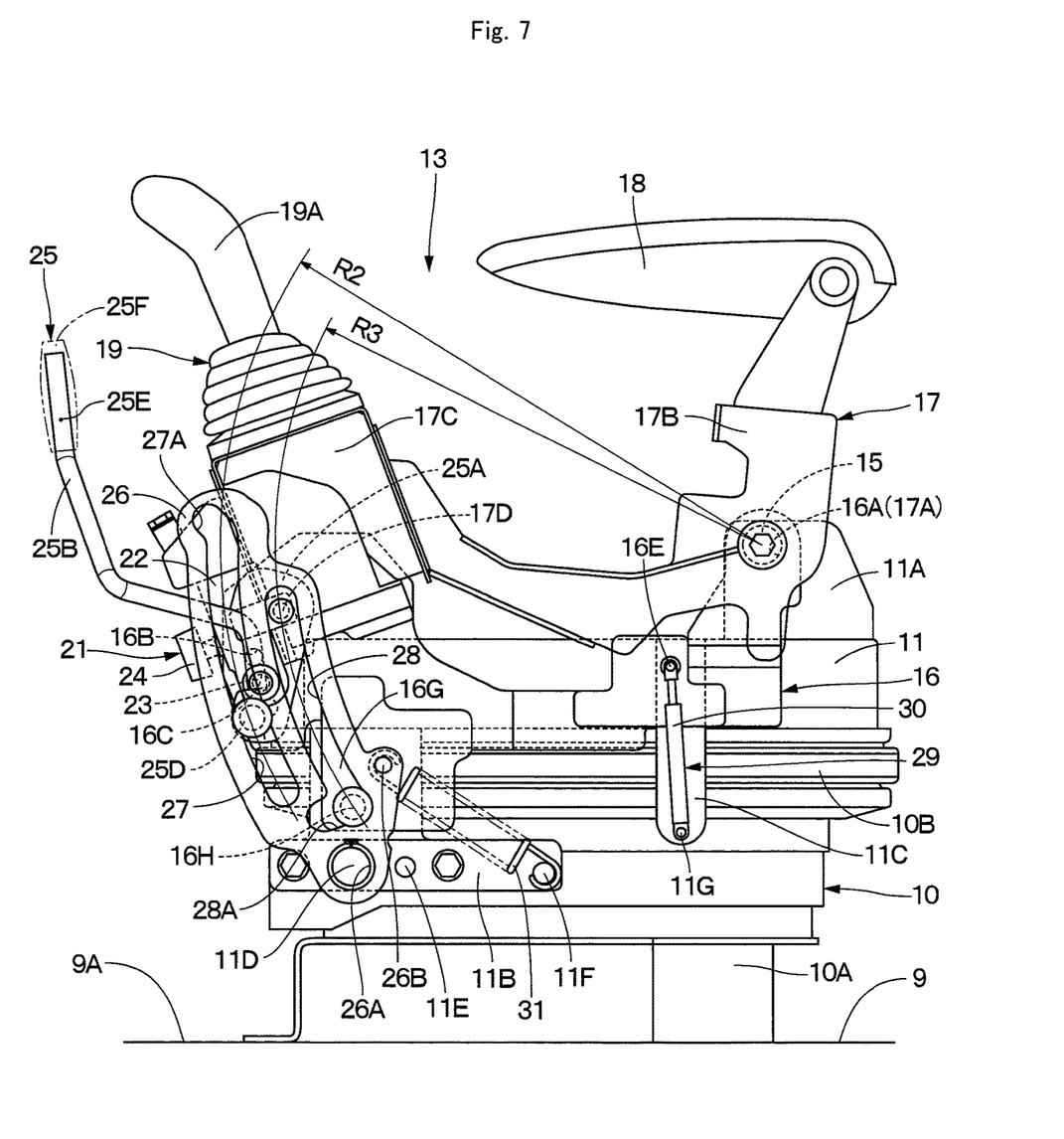
FIG. 7 is a left side view showing an initial state of a jumping-up motion of the control lever.

The gate lock lever 25 maintains the locking position as shown in FIG. 7. When the gate lock lever 25 releases the entrance passage 9A-side, the supply of the pilot pressure to the control levers 19, 20 is stopped. With this configuration, regardless of the operations to the left and right control levers 19, 20 the operation of the actuator is prohibited, and when an operator or the like goes through the entrance passage 9A, even if the operator comes in contact with the control lever 19 or the like in error, the actuator can be prevented from operating inadvertently.

On the other hand, the gate lock lever 25 maintains the lock releasing position as shown in FIG. 3, and when the gate lock lever 25 blocks out the entrance passage 9A, the supply of the pilot pressure to the control levers 19, 20 is made possible. With this configuration, the operation of the actuator in response to the operations of the left and right control levers 19, 20 is allowed.

Here, as shown in FIG. 4, the gate lock lever 25 includes the base plate 25A in a flat plate shape, and a lever member 25B fixed to be integral with the base plate 25A. A shaft through hole 25C is disposed on the upper side of the base plate 25A to penetrate therethrough in the plate thickness direction, and the shaft through hole 25C is inserted in the first shaft body 17D disposed to project on the rotational frame 17 (front-side attachment part 17C). Accordingly, the gate lock lever 25 is rotatably supported via the first shaft body 17D on the rotational frame 17 and is displaced to the locking position and the lock releasing position centering on the first shaft body 17D. A second shaft body 25D is disposed on the lower side of the base plate 25A. The second shaft body 25D is formed in a columnar shape extending in the left-right direction and projects to the left side from the base plate 25A. The second shaft body 25D is movably engaged to a guide groove 27 of the guide plate 26.

The lever member 25B is fixed on the base plate 25A by using the means of welding or the like. The lever member 25B is formed by performing bending work to a round bar material, for example, and the lever member 25B projects forward in such a manner as to block out the entrance passage 9A when the gate lock lever 25 is in the lock releasing position (position in FIG. 3). A tip end side of the lever member 25B becomes a gripping part 25E to be gripped by an operator or the like at the time of operating the gate lock lever 25 and a grip 25F is attached to the gripping part 25E.

The guide plate 26 as a guide member is rotatably attached to the seat base 11. As shown in FIG. 3 and FIG. 4, the guide plate 26 is formed in a flat plate shape extending in the upper-lower direction and is provided with a guide groove 27 and a second guide groove 28. Here, a shaft through hole 26A is disposed on the lower side of the guide plate 26 to penetrate therethrough in the plate thickness direction, and the shaft through hole 26A is inserted via a bearing in the guide plate shaft 11D disposed in the left front projection plate 11B of the seat base 11.

Figure 6:
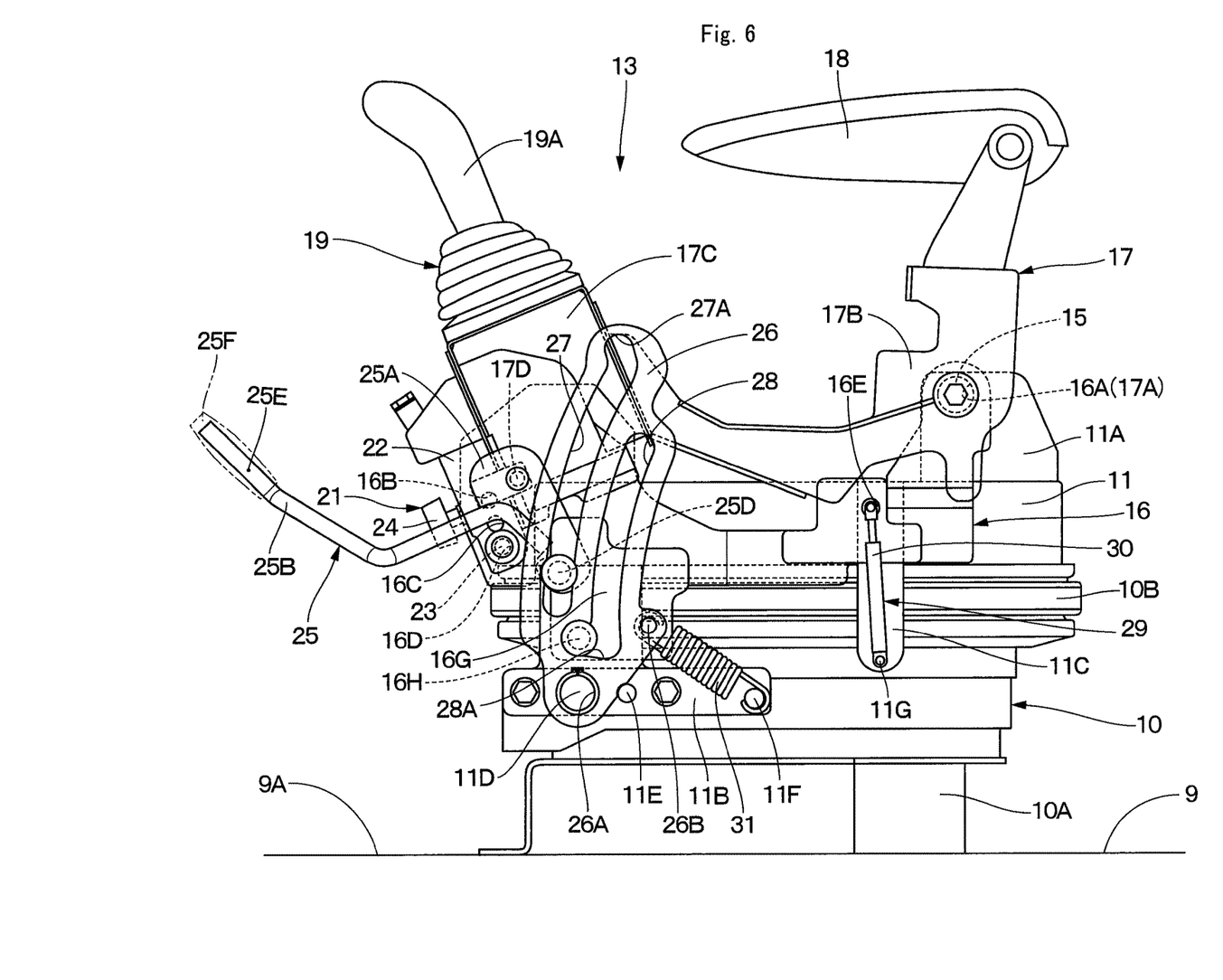
FIG. 6 is a left side view showing a state where the control lever is displaced to a minimum height by the height adjusting mechanism.
Figure 8:
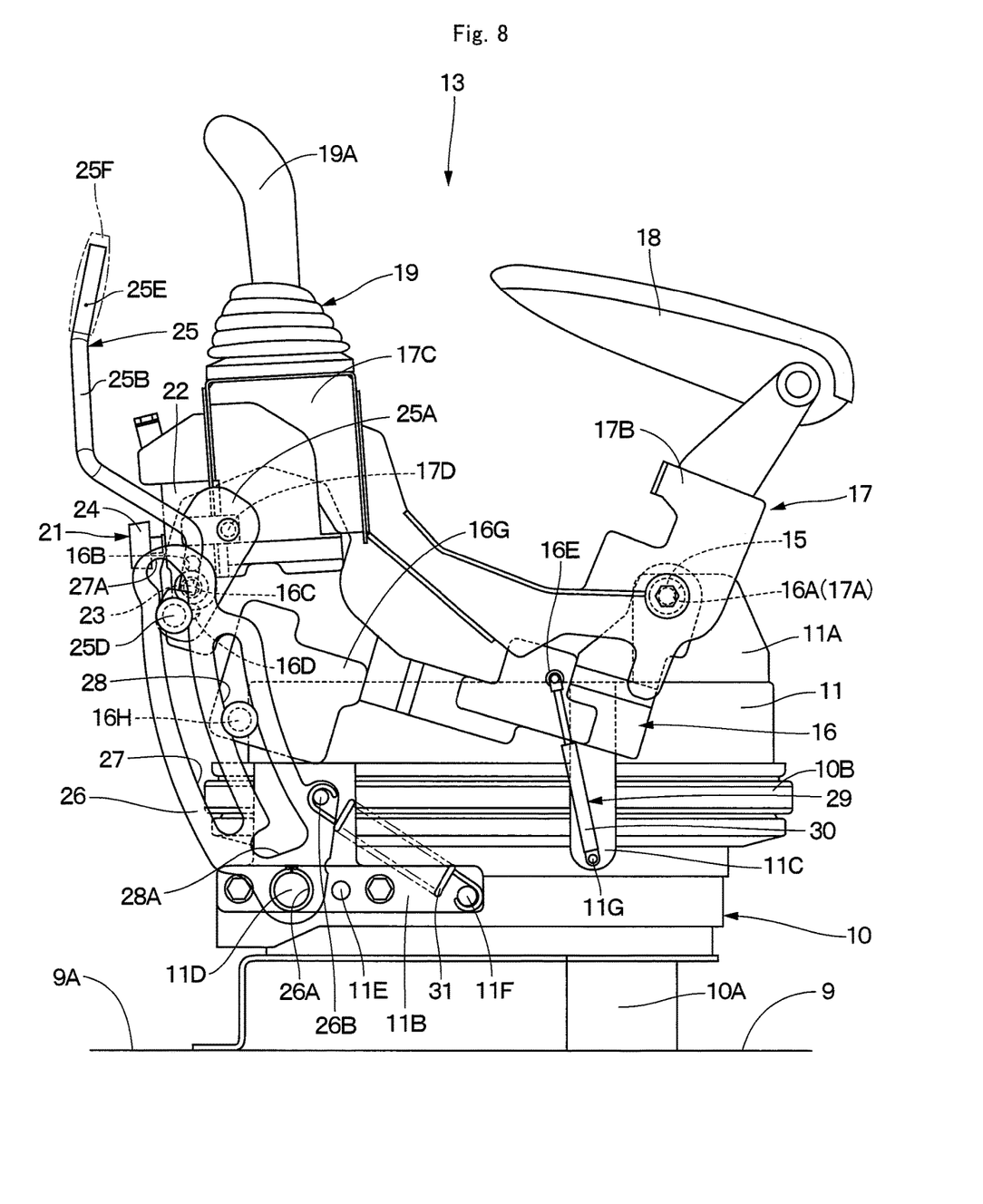
FIG. 8 is a left side view showing a state where the control lever is moved halfway through an upper limit position.
Figure 9:
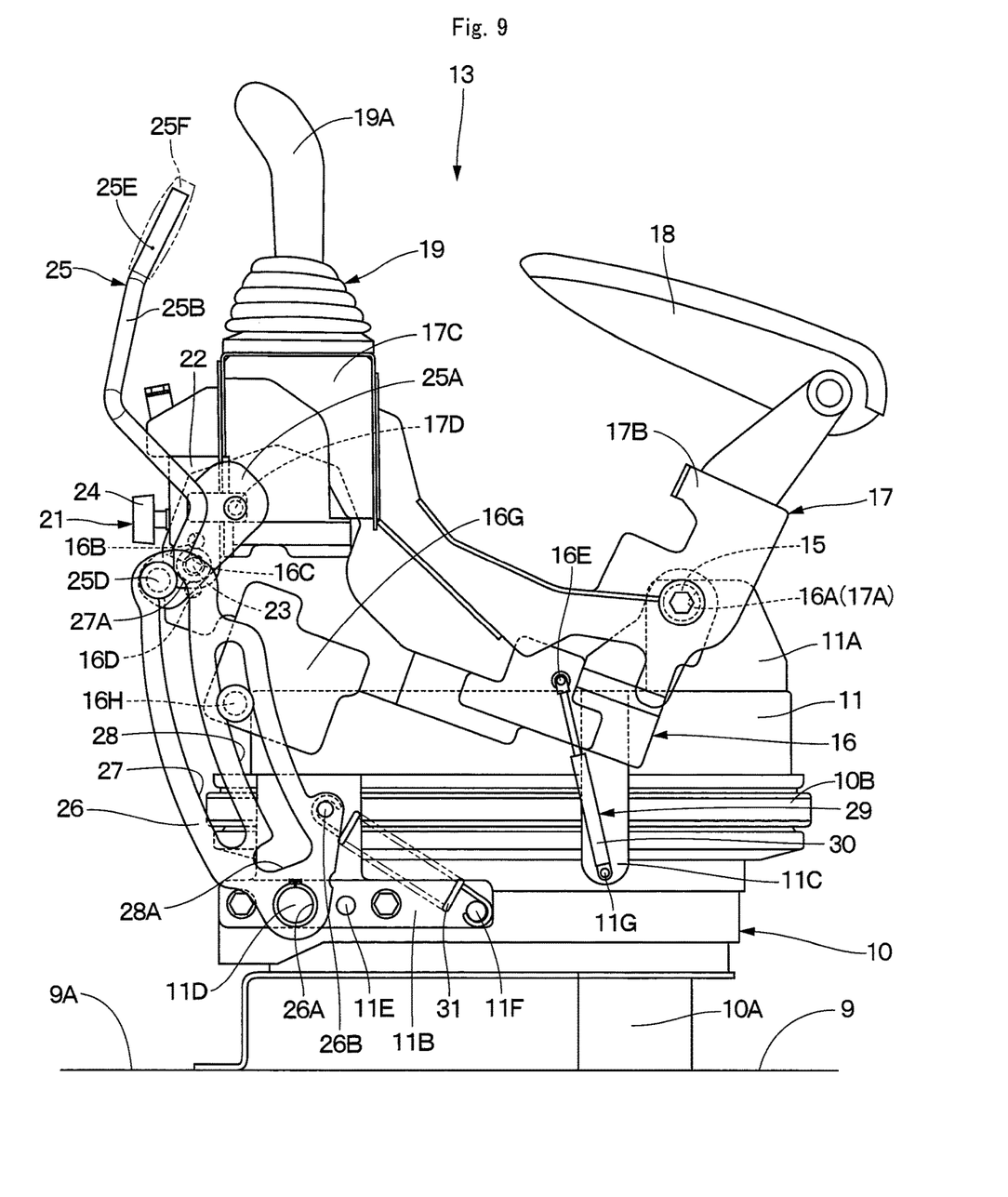
FIG. 9 is a left side view showing a state where the control lever is moved to the upper limit position.

With this configuration, the guide plate 26 is rotatably supported in the front-back direction centering on the guide plate shaft 11D, and at the time of adjusting a height of the control lever 19 by the height adjusting mechanism 21, maintains a lever height adjusting posture as shown in FIG. 3, FIG. 5 and FIG. 6. On the other hand, the guide plate 26, at the time of moving the control lever 19 upward (in a direction of widening the entrance passage 9A) by a control lever moving mechanism 29 to be described later, maintains a lever moving posture as shown in FIG. 7 to FIG. 9. In this way, the guide plate 26 is displaced to the lever height adjusting posture and the lever moving posture centering on the guide plate shaft 11D.

The guide groove 27 is disposed in the guide plate 26 to be positioned closer to the upper side than the shaft through hole 26A. The second shaft body 25D disposed on the base plate 25A of the gate lock lever 25 is engaged to be movable to the guide groove 27. With this configuration, when the rotational frame 17 to which the control lever 19 is attached rotates centering on the support shaft 15 together with the gate lock lever 25 by the height adjusting mechanism 21, the movement of the second shaft body 25D is restricted along a shape of the guide groove 27.

Here, the guide groove 27 is disposed to form a circular arc of a radius R2 centering on the support shaft 15 when the guide plate 26 assumes the lever moving posture (posture in FIG. 7 to FIG. 9). An upper engagement groove 27A is disposed on an upper end of the guide groove 27. The upper engagement groove 27A is located in a portion away from the support shaft 15 by more than the radius R2 of the guide groove 27 and is communicated with an upper end side of the guide groove 27. When the control lever 19 moves to the upper limit position (jumping-up position) as shown in FIG. 9 by a control lever moving mechanism 29 to be described later, the second shaft body 25D of the gate lock lever 25 (base plate 25A) is engaged to the upper engagement groove 27A from the guide groove 27. As a result, the movement of the second shaft body 25D is stopped and the control lever 19 and the gate lock lever 25 maintain the upper limit position in FIG. 9.

The second guide groove 28 is disposed adjacent to the guide groove 27 on the guide plate 26. The second guide groove 28 configures part of the control lever moving mechanism 29. The third shaft body 16H disposed in the rotational bracket 16 (shaft attachment plate 16G) is movably engaged to the second guide groove 28. The second guide groove 28, because of moving the control lever 19 upward by the control lever moving mechanism 29, restricts the movement of the third shaft body 16H when the rotational bracket 16 rotates upward centering on the support shaft 15.

Here, the second guide groove 28 is disposed to form a circular arc of a radius R3 centering on the support shaft 15 when the guide plate 26 assumes the lever moving posture. In this case, the radius R3 of a circular arc shape of the second guide groove 28 is set to be smaller than the radius R2 of the circular arc shape of the guide groove 27 (R2>R3). In this way, when the guide plate 26 assumes the lever moving posture, the guide groove 27 and the second guide groove 28 are respectively arranged on circular arcs different in a radius centering on the support shaft 15.

A lower engagement groove 28A is disposed on a lower end of the second guide groove 28. The lower engagement groove 28A is located in a portion away from the support shaft 15 by more than the radius R3 of the second guide groove 28 and is communicated with a lower end side of the second guide groove 28. When the third shaft body 16H of the rotational bracket 16 is engaged to the lower engagement groove 28A, the guide plate 26 maintains the lever height adjusting posture as shown in FIG. 3 or the like. In addition, when the third shaft body 16H is engaged from the lower engagement groove 28A to the second guide groove 28, the guide plate 26 transfers from the lever height adjusting posture to the lever moving posture.

An upper engagement pin 26B is disposed on a portion, which is adjacent to the lower engagement groove 28A, in the guide plate 26. The upper engagement pin 26B projects to the left side from the guide plate 26 and the other end of the coil spring 31 is engaged to a projection end of the upper engagement pin 26B.

The control lever moving mechanism 29 is disposed in the left console device 13. The control lever moving mechanism 29 is caused to move the control lever 19 upward as a direction of widening the entrance passage 9A centering on the support shaft 15 together with the gate lock lever 25 when the gate lock lever 25 is displace to the locking position. The control lever moving mechanism 29 includes the rotational bracket 16, the rotational frame 17, the gate lock lever 25, the guide plate 26, the gas spring 30 and the coil spring 31.

The gas spring 30 is disposed between the seat base 11 and the rotational bracket 16. A bottom side of the gas spring 30 is rotatably attached to the lower gas spring pin 11G disposed in the seat base 11 (left intermediate projection plate 11C), and a rod side of the gas spring 30 is rotatably attached to the upper gas spring pin 16E disposed in the rotational bracket 16. With this configuration, the gas spring 30 urges the rotational bracket 16 in a direction of being rotated upward centering on the support shaft 15.

The coil spring 31 is disposed between the seat base 11 and the guide plate 26. The coil spring 31 is composed of a tension spring, and one end of the coil spring 31 is engaged to the lower engagement pin 11F of the seat base 11 and the other end of the coil spring 31 is engaged to the upper engagement pin 26B of the guide plate 26. The coil spring 31 urges the guide plate 26 in a direction of abutting on the stopper shaft 11E centering on the guide plate shaft 11D.

The left console device 13 in the hydraulic excavator 1 according to the present embodiment has the configuration as described above, and next, an explanation will be made of the operation (jumping-up operation) of moving the control lever 19 upward (in a direction of widening the entrance passage 9A) by the control lever moving mechanism 29.

At the time of performing the jumping-up operation of the control lever 19 by the control lever moving mechanism 29, for example, the gate lock lever 25 in the lock releasing position in FIG. 3 is rotated upward centering on the first shaft body 17D disposed to project on the rotational frame 17. With this configuration, as shown in FIG. 7, the second shaft body 25D disposed in the gate lock lever 25 presses the guide plate 26 forward against the coil spring 31. Therefore, the guide plate 26 rotates forward centering on the guide plate shaft 11D to be displaced to the lever moving posture. At this time, the third shaft body 16H disposed to project on the rotational bracket 16 leaves the lower engagement groove 28A of the guide plate 26 and is engaged to the second guide groove 28.

Therefore, the rotational bracket 16 rotates upward centering on the support shaft 15 by the gas spring 30. At this time, since the positioning pin 23 in the height adjusting mechanism 21 is engaged to any one of the height adjusting holes 16B to 16D (for example, the height adjusting hole 16C), the rotational frame 17 and the rotational bracket 16 are united. Accordingly, the rotational bracket 16, the rotational frame 17, the control lever 19 and the gate lock lever 25 integrally rotates upward centering on the support shaft 15.

When the guide plate 26 is displaced to the lever moving posture, the guide groove 27 and the second guide groove 28 of the guide plate 26 are respectively arranged on circular arcs different in a radius centering on the support shaft 15. Therefore, the second shaft body 25D of the gate lock lever 25 smoothly moves upward along the guide groove 27, and the third shaft body 16H of the rotational bracket 16 can smoothly move upward along the second guide groove 28. As a result, the control lever 19 and the gate lock lever 25 can be moved to the upper limit position in a state of being associated with each other, improving the workability.

In addition, as shown in FIG. 9, when the second shaft body 25D of the gate lock lever 25 is engaged to the upper engagement groove 27A disposed on the upper end side of the guide groove 27, the movement of the second shaft body 25D is stopped, and the control lever 19 and the gate lock lever 25 are stopped in the upper limit position (jumping-up position). With this configuration, in a state where the gate lock lever 25 is set in the locking position, the control lever 19 and the gate lock lever 25 are moved in the direction of widening the entrance passage 9A, making it possible to secure a space of the entrance passage 9A to be large.

In this way, when the control lever 19 and the gate lock lever 25 are moved to the upper limit position, the second shaft body 25D of the gate lock lever 25 is engaged to the upper engagement groove 27A disposed on the upper end side of the guide groove 27. Therefore, the rotational frame 17 connected via the first shaft body 17D to the gate lock lever 25 is interrupted from rotating centering on the support shaft 15. Accordingly, the positioning pin 23 of the height adjusting mechanism 21 attached to the rotational frame 17 cannot be removed from/inserted in the height adjusting holes 16B, 16C, 16D of the rotational bracket 16. That is, in the present embodiment, in a state where the control lever 19 and the gate lock lever 25 are moved to the upper limit position, it is possible to prohibit the adjustment of the height position of the control lever 19 relative to the operator's seat 12.

As a result, in a state where the control lever 19 and the gate lock lever 25 are moved to the upper limit position, the control lever 19 can be prevented from being set to an unintentional height position due to an operator or the like in error contacting the release lever 24 of the height adjusting mechanism 21 or the like. Accordingly, in a state where the gate lock lever 25 is displaced to the lock releasing position, the operator sitting on the operator's seat 12 can accurately adjust the height position of the control lever 19.

Next, an explanation will be made of the height adjusting operation of adjusting the height position of the control lever 19 relative to the operator's seat 12 by the height adjusting mechanism 21.

At the time of performing the height adjusting operation of the control lever 19 by the height adjusting mechanism 21, for example, the gate lock lever 25 in the upper limit position is rotated downward (forward) centering on the first shaft body 17D. As a result, as shown in FIG. 8, the second shaft body 25D leaves the upper engagement groove 27A of the guide groove 27 and is engaged to the guide groove 27. In this state, the gate lock lever 25 is pressed downward against the gas spring 30.

With this configuration, the rotational bracket 16, the rotational frame 17, the control lever 19 and the gate lock lever 25 integrally rotate downward centering on the support shaft 15. In addition, as shown in FIG. 7, when the third shaft body 16H of the rotational bracket 16 reaches the lower end of the second guide groove 28 in the guide plate 26, the gate lock lever 25 is rotated further downward (forward) centering on the first shaft body 17D.

With this configuration, the second shaft body 25D of the gate lock lever 25 presses the guide plate 26 backward, and the guide plate 26 rotates backward centering on the guide plate shaft 11D. In this way, as shown in FIG. 3, the third shaft body 16H of the rotational bracket 16 is engaged to the lower engagement groove 28A from the second guide groove 28. At this time, the guide plate 26 abuts on the stopper shaft 11E of the seat base 11 by the coil spring 31 to maintain the lever height adjusting posture.

In this way, in a state where the guide plate 26 maintains the lever height adjusting posture, the rotational bracket 16 is fixed via the guide plate 26 on the seat base 11. In this state, the height adjustment of the control lever 19 relative to the operator's seat 12 is performed by the height adjusting mechanism 21.

For example, as shown in FIG. 3, in a case where the positioning pin 23 of the height adjusting mechanism 21 is inserted in the height adjusting hole 16C of the rotational bracket 16, an operator or the like rotates the release lever 24 to separate the positioning pin 23 from the height adjusting hole 16C. With this configuration, the rotational frame 17 to which the control lever 19 is attached is made rotatable in the upper-lower direction centering on the support shaft 15.

Accordingly, when the rotational frame 17 is caused to rotate upward and the positioning pin 23 is inserted in the height adjusting hole 16B, as shown in FIG. 5 the height position of the control lever 19 can be adjusted to the maximum height. In addition, when the rotational frame 17 is caused to rotate downward and the positioning pin 23 is inserted in the height adjusting hole 16D, as shown in FIG. 6 the height position of the control lever 19 can be adjusted to the minimum height. Further, when the positioning pin 23 is inserted in the height adjusting hole 16C, as shown in FIG. 3 the height position of the control lever 19 can be adjusted to the intermediate height.

In this way, when the height position of the control lever 19 is adjusted by the height adjusting mechanism 21, the control lever 19 attached to the rotational frame 17 and the gate lock lever 25 attached via the first shaft body 17D to the rotational frame 17 rotate together centering on the support shaft 15. The gate lock lever 25 is made rotatable relative to the rotational frame 17 centering on the first shaft body 17D, and the second shaft body 25D disposed in the gate lock lever 25 is engaged to the guide groove 27 of the guide plate 26 to restrict the movement.

Figure 10:
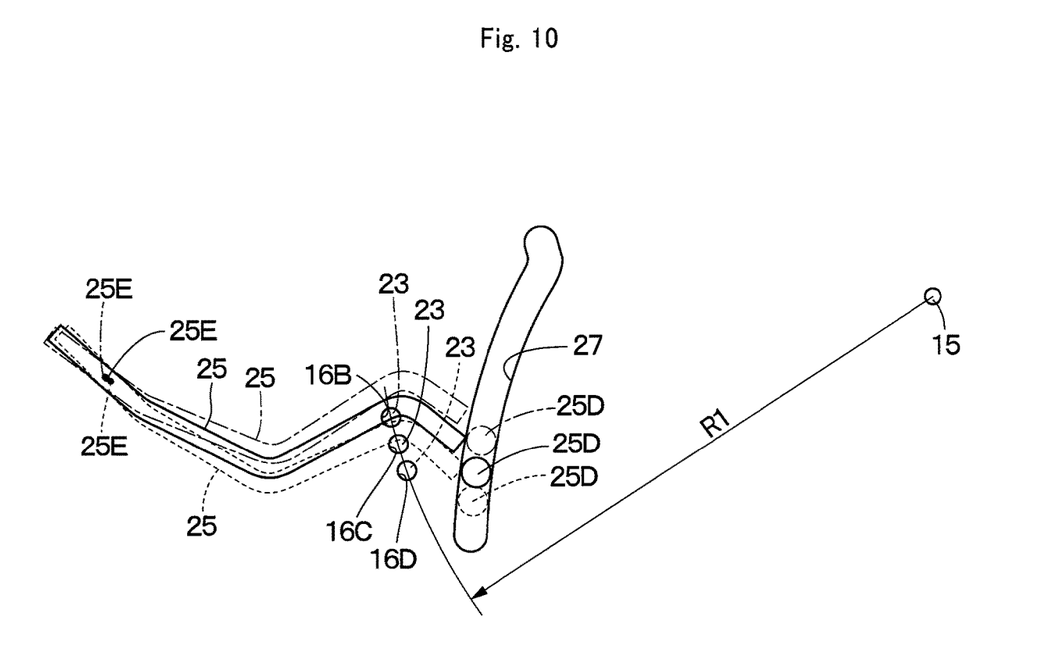
FIG. 10 is a schematic diagram showing displacements of a positioning pin, a second shaft body and a gripping part of the gate lock lever at the height adjusting of the control lever.

Here, FIG. 10 shows a state where the gate lock lever 25 is displaced in three states following a displacement of the height position of the control lever 19. When the control lever 19 is in the intermediate height, the gate lock lever 25 is displaced to an intermediate position as shown by a solid line, when the control lever 19 is in the maximum height, the gate lock lever 25 is displaced to an upper position as shown by a dashed-dotted line and when the control lever 19 is in the minimum height, the gate lock lever 25 is displaced to a lower position as shown by a broken line.

As shown in FIG. 10, since the height adjusting holes 16B to 16D are arranged in a circular arc shape of a radius R1 centering on the support shaft 15, the positioning pin 23 of the height adjusting mechanism 21 moves on a circular arc-shaped path centering on the support shaft 15 together with the rotational frame 17. On the other hand, the gate lock lever 25 is rotatably attached via the first shaft body 17D to the rotational frame 17, and the second shaft body 25D disposed in the gate lock lever 25 is engaged to the guide groove 27 of the guide plate 26. Therefore, the movement of the second shaft body 25D is restricted by a shape of the guide groove 27. As a result, even when the gate lock lever 25 is displaced to the intermediate position, the upper position and the lower position, a change in a height position of the gripping part 25E of the gate lock lever 25 (lever member 25B) is suppressed, making it possible to hold the gripping part 25E in a constant position. That is, the guide groove 27 restricts the movement of the second shaft body 25D following a change in a position of the rotational frame 17 by the height adjusting mechanism 21 centering on the support shaft 15 to suppress a change in a height position of the gripping part 25E of the gate lock lever 25.

Therefore, by adjusting the height position of the control lever 19, even when the gate lock lever 25 is displaced to three positions of the intermediate position, the upper position and the lower position, an operator sitting on the operator's seat 12 can always grip the gripping part 25E of the gate lock lever 25 without having an uncomfortable feeling in a substantially constant position by expanding his/her arm with the same posture being kept. As a result, for example, the gate lock lever 25 can smoothly be operated from the lock releasing position to the locking position, and even in a case where the height position of the control lever 19 is adjusted, the operability to the gate lock lever 25 can be maintained to be good. In this case, a groove shape of the guide groove 27 corresponds to a moving path drawn by the second shaft body 25D at the time of moving the control lever 19 in the direction of widening the entrance passage 9A by the control lever moving mechanism 29. As a result, utilizing the guide groove 27 as the moving path of the second shaft body 25D when the control lever 19 is moved to the upper limit position, the gripping part 25E of the gate lock lever 25 can be kept in a constant position at the height adjusting of the control lever 19.

It should be noted that in the present embodiment, the constant position in which the gripping part 25E of the gate lock lever 25 is kept during the time of adjusting the height position of the control lever 19 is not limited to one point but, for example, when an operator grips the gripping part 25E in a state where the gate lock lever 25 is displaced to the intermediate position, is defined as a range in which an operator can accommodate the gripping part 25E in hand without changing the posture.

In this way, in the hydraulic excavator 1 according to the present embodiment the left console device 13 positioned on the entrance passage 9A-side for getting in/off the operator's seat 12 includes: the support shaft 15 disposed in the seat base 11 to which the operator's seat 12 is attached; the rotational frame 17 that is supported to be rotatable in the upper-lower direction on the support shaft 15 and to which the control lever 19 is attached; and the height adjusting mechanism 21 for adjusting the position of the rotational frame 17 in the rotating direction centering on the support shaft 15, and the gate lock lever 25 includes: the base plate 25A that is supported to be rotatable on the first shaft body 17D disposed in the rotational frame 17 and in which the second shaft body 25D is disposed in the position different from that of the first shaft body 17D; and the lever member 25B that is disposed to be integral with the base plate 25A and is provided with the gripping part 25E for the gripping of an operator, wherein the seat base 11 is provided with the guide plate 26 rotatable in the front-back direction of the operator's seat 12, the guide plate 26 being provided with the guide groove 27 formed for engagement of the second shaft body 25D of the gate lock lever 25, and the guide groove 27 restricting the movement of the second shaft body 25D following the change in the position of the rotational frame 17 by the height adjusting mechanism 21 in the rotating direction centering on the support shaft 15 to suppress the change in the height position of the gripping part 25E of the lever member 25B.

According to the configuration, when the adjustment of the height position relative to the operator's seat 12 of the control lever 19 is performed by the height adjusting mechanism 21, the rotational frame 17 rotates in the upper-lower direction centering on the support shaft 15 together with the gate lock lever 25. At this time, the movement of the second shaft body 25D disposed on the base plate 25A of the gate lock lever 25 is restricted by the guide groove 27 of the guide plate 26. With this configuration, the change in the height position of the gripping part 25E of the gate lock lever 25 can be suppressed.

In the embodiment the left console device 13 is provided with the control lever moving mechanism 29 that rotates the rotational frame 17 to which the control lever 19 is attached, upward together with the gate lock lever 25 when the gate lock lever 25 is displaced to the locking position, and a groove shape of the guide groove 27 corresponds to the moving path drawn by the second shaft body 25D when the rotational frame 17 rotates upward by the control lever moving mechanism 29. According to this configuration, at the time of rotating the control lever 19 upward toward the upper limit position, the change in the height position of the gripping part 25E of the gate lock lever 25 can be suppressed by utilizing the guide groove 27 as the moving path of the second shaft body 25D.

In the embodiment the guide plate 26 is provided with the second guide groove 28 formed adjacent to the guide groove 27, and the control lever moving mechanism 29 is provided with the rotational bracket 16 in which the third shaft body 16H engaged to the second guide groove 28 is formed and that is supported on the support shaft 15 in the state of being rotatable in the upper-lower direction, and a connecting part for connection between the rotational bracket 16 and the rotational frame 17, wherein the guide groove 27 and the second guide groove 28 are arranged on the circular arcs different in a radius centering on the support shaft 15.

According to this configuration, when the control lever 19 is caused to rotate upward by using the control lever moving mechanism 29, the second shaft body 25D disposed in the gate lock lever 25 and the third shaft body 16H disposed in the rotational bracket 16 can move in the circular arc-shaped path centering on the support shaft 15. As a result, the control lever 19 and the gate lock lever 25 can be rotated upward in a state of being associated with each other, making it possible to move the control lever 19 and the gate lock lever 25 in the direction (to the upper limit position) of widening the entrance passage 9A, improving the workability.

It should be noted that in the embodiment there is shown as an example a case where in the hydraulic excavator 1 in which the left front part of the floor member 9 serves as the entrance passage 9A, the left console device 13 positioned on the entrance passage 9A-side is provided with the gate lock lever 25, the control lever moving mechanism 29 and the like. However, the present invention is not limited thereto but in a hydraulic excavator in which a right front part of a floor member serves as an entrance passage, a right console device positioned on an entrance passage side may be provided with a gate lock lever, a control lever moving mechanism and the like.

In the embodiment there is shown as an example a case where a height adjusting hole in which the positioning pin 23 in the height adjusting mechanism 21 is inserted comprises three holes disposed in the rotational bracket 16. However, the present invention is not limited thereto but for example, two, four or more height adjusting holes may be provided.

In the embodiment, the hydraulic excavator 1 provided with the lower traveling structure 2 of a crawler type is shown as an example of the construction machine provided with the left and right console devices 13, 14. However, the present invention is not limited thereto, but may be applied widely to other construction machines, such as a hydraulic excavator provided with a lower traveling structure of a wheel type.

DESCRIPTION OF REFERENCE NUMERALS

9: FLOOR MEMBER
9A: ENTRANCE PASSAGE
11: SEAT BASE
12: OPERATOR'S SEAT
13: LEFT CONSOLE DEVICE
14: RIGHT CONSOLE DEVICE
15: SUPPORT SHAFT
16: ROTATIONAL BRACKET
16B, 16C, 16D: HEIGHT ADJUSTING HOLE (CONNECTING PART)
16H: THIRD SHAFT BODY
17: ROTATIONAL FRAME
17D: FIRST SHAFT BODY
19, 20: CONTROL LEVER
21: HEIGHT ADJUSTING MECHANISM
23: POSITIONING PIN (CONNECTING PART)
25: GATE LOCK LEVER
25A: BASE PLATE
25B: LEVER MEMBER
25D: SECOND SHAFT BODY
25E: GRIPPING PART
26: GUIDE PLATE (GUIDE MEMBER)
27: GUIDE GROOVE
28: SECOND GUIDE GROOVE
29: CONTROL LEVER MOVING MECHANISM

The invention claimed is:

1. A construction machine comprising:
an operator's seat;
a console device provided with a control lever for operating an actuator; and
a gate lock lever that is disposed in the console device and is displaced to a locking position for prohibiting an operation of the actuator in response to an operation of the control lever and a lock releasing position for allowing the operation of the actuator in response to the operation of the control lever, characterized in that
the console device includes:
a support shaft disposed in a seat base to which the operator's seat is attached;
a rotational frame that is supported to be rotatable in an upper-lower direction on the support shaft and to which the control lever is attached; and
a height adjusting mechanism for adjusting a position of the rotational frame in a rotating direction centering on the support shaft, and
the gate lock lever includes:
a base plate that is supported to be rotatable on a first shaft body disposed in the rotational frame and in which a second shaft body is disposed in a position different from that of the first shaft body; and
a lever member that is disposed to be integral with the base plate and is provided with a gripping part for gripping by an operator, wherein
the seat base is provided with a guide member rotatable in a front-back direction of the operator's seat, the guide member being provided with a guide groove formed for engagement of the second shaft body of the gate lock lever, and the guide groove restricting a movement of the second shaft body following a change in a position of the rotational frame by the height adjusting mechanism in the rotating direction centering on the support shaft to suppress a change in a height position of the gripping part of the lever member.

2. The construction machine according to claim 1, wherein
the console device is provided with a control lever moving mechanism that rotates the rotational frame to which the control lever is attached, upward together with the gate lock lever when the gate lock lever is displaced to the locking position, and
a groove shape of the guide groove corresponds to a moving path drawn by the second shaft body when the rotational frame rotates upward by the control lever moving mechanism.

3. The construction machine according to claim 2, wherein
the guide member is provided with a second guide groove formed adjacent to the guide groove, and the control lever moving mechanism is provided with:
a rotational bracket in which a third shaft body engaged to the second guide groove is formed and that is supported on the support shaft in a state of being rotatable in the upper-lower direction; and
a connecting part for connection between the rotational bracket and the rotational frame, wherein
the guide groove and the second guide groove are respectively arranged on circular arcs different in a radius centering on the support shaft.

* * * * *